US012500280B2

(12) United States Patent
Zeidler et al.

(10) Patent No.: US 12,500,280 B2
(45) Date of Patent: Dec. 16, 2025

(54) DEVICE AND METHOD FOR MONITORING AT LEAST THREE BATTERY CELLS OF A BATTERY

(71) Applicant: Hella GmbH & Co. KGaA, Lippstadt (DE)

(72) Inventors: Alexander Zeidler, Berlin (DE); Tomasz Efner, Wolczkowo (PL)

(73) Assignee: Hella GmbH & Co. KGaA, Lippstadt (DE)

( * ) Notice: Subject to any disclaimer, the term of this patent is extended or adjusted under 35 U.S.C. 154(b) by 780 days.

(21) Appl. No.: 17/841,765

(22) Filed: Jun. 16, 2022

(65) Prior Publication Data
US 2022/0311065 A1    Sep. 29, 2022

Related U.S. Application Data

(63) Continuation of application No. PCT/EP2020/085746, filed on Dec. 11, 2020.

(30) Foreign Application Priority Data

Dec. 17, 2019    (DE) .................... 10 2019 134 757.2

(51) Int. Cl.
*H01M 10/48* (2006.01)
*G01R 31/3835* (2019.01)
*H02J 7/00* (2006.01)

(52) U.S. Cl.
CPC ...... *H01M 10/482* (2013.01); *G01R 31/3835* (2019.01); *H02J 7/0019* (2013.01)

(58) Field of Classification Search
CPC ...... H02J 7/0013; H02J 7/0016; H02J 7/0047; H01M 10/482; G01R 31/3835;
(Continued)

(56) References Cited

U.S. PATENT DOCUMENTS 8,587,318 B2    11/2013    Chandler et al.
9,018,956 B2    4/2015    Eguchi et al.
(Continued)

FOREIGN PATENT DOCUMENTS

DE    102011108038 B4    7/2019
EP    3358361 A1 *    8/2018    ........... G01R 31/396
(Continued)

OTHER PUBLICATIONS

International Search Report dated Apr. 19, 2021 in corresponding application PCT/EP2020/085746.

*Primary Examiner* — Julian D Huffman
*Assistant Examiner* — John P Ondrasik
(74) *Attorney, Agent, or Firm* — Muncy, Geissler, Olds & Lowe, P.C.

(57) ABSTRACT

A device for monitoring at least three battery cells connected in series. The device includes, for each battery cell, a measuring circuit associated with the battery cell, which measuring circuit has an electrical load and can be switched by a controllable switching element such that the electrical load can be connected into a path parallel to the battery cell associated with the measuring circuit. A control unit that is designed to switch a first measuring circuit, which is associated with the first battery cell, and a third measuring circuit, which is associated with the third battery cell, such that the electrical loads of the two measuring circuits are each connected into the path parallel to the battery cell associated with the respective measuring circuit, and to ascertain whether the switching element of the first measuring circuit is switching correctly.

11 Claims, 5 Drawing Sheets

(58) Field of Classification Search
CPC ............ G01R 31/2621; G01R 31/3277; G01R 31/386; G01R 31/396
See application file for complete search history.

(56) References Cited

U.S. PATENT DOCUMENTS

| | | | |
|---|---|---|---|
| 2012/0146652 A1* | 6/2012 | Aoki | G01R 31/396 324/433 |
| 2014/0055896 A1* | 2/2014 | Muramoto | H02J 7/0016 361/86 |
| 2016/0254683 A1* | 9/2016 | Matsumoto | B60L 58/22 320/118 |
| 2018/0149689 A1* | 5/2018 | Ollitrault | G01R 19/257 |
| 2019/0064272 A1* | 2/2019 | Miura | H02J 7/0016 |
| 2023/0147606 A1* | 5/2023 | Nakayama | G01R 19/16542 320/118 |

FOREIGN PATENT DOCUMENTS

| | | |
|---|---|---|
| EP | 2848955 B1 | 9/2018 |
| JP | 2015070681 A | 4/2015 |

* cited by examiner

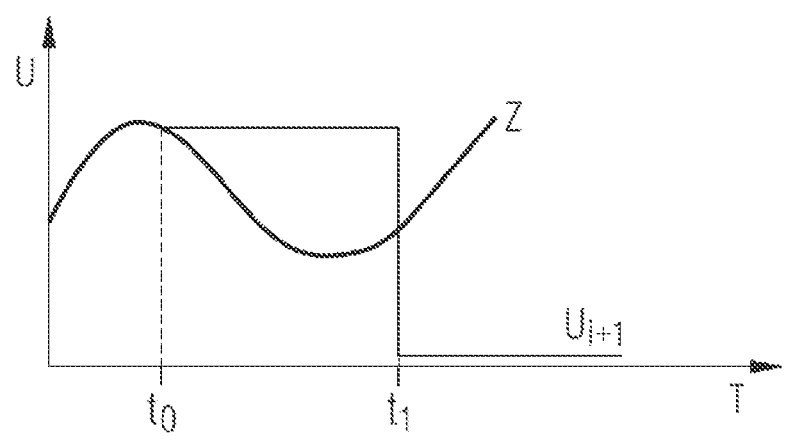

DEVICE AND METHOD FOR MONITORING AT LEAST THREE BATTERY CELLS OF A BATTERY

This nonprovisional application is a continuation of International Application No. PCT/EP2020/085746, which was filed on Dec. 11, 2020, and which claims priority to German Patent Application No. 10 2019 134 757.2, which was filed in Germany on Dec. 17, 2019, and which are both herein incorporated by reference.

BACKGROUND OF THE INVENTION

Field of the Invention

The present invention relates to a device for monitoring at least three battery cells of a battery, the first battery cell, second battery cell, and third battery cell of which are connected in series in the stated sequence. The invention further relates to a method for monitoring at least three battery cells of a battery.

Description of the Background Art

Batteries, in particular rechargeable batteries, that have multiple battery cells connected in series are known from the prior art. During charging and discharging processes, these battery cells are operated between a minimum voltage, for example 1.8 V, and a maximum voltage, for example 4.2 V. Around the operating point, the battery cells have a rated voltage, for example 3.6 V. If the voltage of a battery cell rises above the maximum voltage or falls below the minimum voltage, the possibility of irreversible damage to the battery cell exists. As a result, overheating of the battery cell in question or a short circuit can occur. In order to prevent this, all battery cells of the battery are monitored by means of a so-called battery management system. For this purpose, the battery management system senses the voltage between the poles of the battery cells and ascertains whether this voltage lies between the minimum voltage and the maximum voltage.

In known batteries, furthermore, the states of charge of the individual battery cells of the battery are equalized to one another in order to be able to utilize the battery capacity optimally. This is accomplished, in particular passively, through intentional discharging of individual battery cells. For this purpose, a resistive element is customarily connected in parallel to the battery cell to be discharged with the aid of a switching element, for example with the aid of a field effect transistor (FET). For the intentional discharging to function without problems, it is necessary to ensure that all switching elements or all FETs switch correctly and that the resistive elements are connected correctly to the battery cells. This is customarily accomplished by the means that a voltage difference is sensed by the battery management system at switching of the FET. If this voltage difference does not arise, the battery management system can conclude that the FET has not switched. However, it is difficult to distinguish the voltage difference at switching of the FET from a voltage difference that arises when an electrical load is present at the battery cell. It is thus not possible to determine reliably whether the FET has switched or not.

SUMMARY OF THE INVENTION

It is therefore an object of the present invention to provide a device and method via which it is possible to easily and reliably monitor a battery having at least three battery cells connected in series, even under load.

In an exemplary embodiment, the device includes, for each of the three battery cells, a measuring circuit associated with the respective battery cell in each case, which measuring circuit has an electrical load and can be switched by means of a controllable switching element in such a manner that the electrical load can be connected into a path parallel to the battery cell associated with the measuring circuit. The device additionally has a control unit that is designed to control a first measuring circuit, which is associated with the first battery cells and a third measuring circuit, which is associated with the third battery cell, in such a manner that the electrical loads of the two measuring circuits are each connected into the path parallel to the battery cell associated with the respective measuring circuit. The control unit is additionally designed to ascertain, on the basis of the voltage of the second battery cell and the voltage that drops across the electrical load and the switching element of the first measuring circuit, whether the switching element of the first measuring circuit is switching correctly.

The path parallel to the respective battery cells in this case includes at least the electrical load as well as the switching element. The voltage of a battery cell of the battery and the voltage that drops across the electrical load and the switching element of the measuring circuit associated with the battery cell when the electrical load is switched into a path parallel to the battery cells differ, in particular, by a relatively small amount F. This voltage difference results from the fact that the electrical load, the switching element, and the power that connect the aforementioned elements to the battery cells form a voltage divider. By means of current flow, the voltage difference at switching of the switching element of one of the measuring circuits affects both the voltage of the battery cell associated with this measuring circuit and the voltage of the battery cell immediately adjacent to this battery cell. The voltage difference at switching of the switching element in the case of the immediately adjacent battery cells is −F/2. This means that the voltage of the second battery cell changes by the amount −F when the switching elements of the measuring circuits associated with the first battery cells and the third battery cells are switched and are switching correctly.

If an electrical load is now present at the battery, then the voltage of all battery cells changes in the same direction, which is to say the voltage difference caused by the electrical load has the same sign for all battery cells. If the voltage difference −F at the second battery cell and the voltage difference F at the electrical load and the switching element of the first measuring circuit are now sensed by the control unit, it is ensured that this voltage change was not caused by an electrical load and that the switching element of the first measuring circuit has switched correctly. Consequently, monitoring of the battery, even under load, is easily and reliably possible by means of the device according to claim 1.

The electrical load of at least one measuring circuit can be a resistive element, a capacitive element, or an inductive element. In particular, the electrical load of the at least one measuring circuit is an ohmic resistance.

An electrical connection between at least one measuring circuit and the battery cell associated with the measuring circuit is a detachable electrical connection. This detachable electrical connection is, in particular, a plug-and-socket connection or a clamped connection. A detachable electrical connection between the measuring circuit and the battery cell associated with the measuring circuit makes it possible to replace the measuring circuit easily if it should be necessary, for example when the switching element of the measuring circuit is no longer switching correctly.

It is advantageous when at least one measuring circuit has a capacitive element that is connected into a path parallel to the electrical load of the measuring circuit and into the path parallel to the battery cell associated with the measuring circuit. The voltage of the capacitive element, which is to say the voltage that is measured across the two poles of the capacitive element, is equal to the voltage of the battery cells that is associated with the at least one measuring circuit when the at least one measuring circuit is not connected. If the at least one measuring circuit is connected, the capacitive element is discharged through the electrical load and the switching element of the at least one measuring circuit, and as a result equalizes to the voltage that drops across the electrical load and the switching element. In this case, an RC circuit is formed by the electrical load, the switching element, and the capacitive element. This RC circuit is a low-pass filter that smoothes the voltage dropping across the electrical load and the switching element. Noise is filtered out of the voltage signal by this means. The filtered voltage signal is processed further by the control unit. The sensing of the voltage difference F is thus accomplished more reliably.

The control unit can be set up such that it can be ascertained in a first step whether an electrical interruption is present and it can be ascertained in a second step whether the switching element in question has a fault.

A comparison of the voltage takes place on the basis of the same voltage measuring unit. Advantageously, a test takes place with regard to the electrical interruption with the aid of one voltage measuring unit in each case. Advantageously, a test takes place with regard to the function of the relevant switching element by a comparison of at least two voltage measuring units, in particular by a comparison of voltage measuring units whose associated voltage measuring units are not immediately adjacent. Battery cells that are not connected by another battery cell are "immediately adjacent."

It is furthermore advantageous when the measuring circuit has a resistive element that is connected into the path parallel to the electrical load of the measuring circuit and to the battery cell associated with the measuring circuit and is connected in series with the capacitive element. Provision of the resistive element that is connected in series with the capacitive element affects the time constant of the RC circuit. In other words, the discharge behavior of the capacitive element at switching of the switching element is affected by the provision of the resistive element. The time constant can be determined from parameters of the RC circuit. If the capacitive element discharges differently at switching of the switching element than is expected on the basis of the time constant, this is an indication of a malfunction of the measuring circuit, for example it is an indication of a short circuit in the measuring circuit.

In particular, the control unit is designed to ascertain, on the basis of the voltage and/or of the voltage curve of the capacitive element, whether an electrical interruption is present in the measuring circuit. "Electrical interruption" is understood in the present application to mean, in particular, an electrical disconnection, as for example a line break, between the measuring circuit and the battery cell associated with the measuring circuit. Such an electrical interruption can also be a physical disconnection of the electrical connection, however, for example a detached plug-and-socket connection, or a high-resistance connection, which can arise due to corrosion in the electrical connection, for example. The voltage of the capacitive element follows the voltage of the battery cell that is associated with the at least one measuring circuit. If an electrical interruption now occurs in the measuring circuit, the voltage of the capacitive element no longer changes. In other words, the voltage of the capacitive element corresponds to the voltage of the battery cells at the time of the electrical interruption. If the measuring circuit is subsequently connected, the capacitive element can discharge. The voltage of the capacitive element then decreases to zero with a known time constant. This behavior can be ascertained by the control unit in order to reliably ascertain an electrical interruption in the measuring circuit.

At least one measuring circuit can have a voltage measuring unit that is arranged and designed in such a manner that the voltage measuring unit measures the voltage of the battery cell associated with the measuring circuit when the measuring circuit is not connected, and that the voltage measuring unit measures the voltage drop across the electrical load and the switching element of the measuring circuit when the measuring circuit is connected. In this embodiment, the voltage measuring unit is arranged in an electrical path that is parallel to the battery cell associated with the at least one measuring circuit and is parallel to the electrical load and the switching element of the at least one measuring circuit. If the switching element of the at least one measuring circuit is not switched, an electrical circuit formed of the battery cell and the voltage measuring unit is closed, and the voltage measuring unit measures the voltage of the battery cells. If, in contrast, the switching element is switched, a different electrical circuit formed of the switching element, the electrical load, and the voltage measuring unit is closed, and the voltage measuring unit measures the voltage that drops across the switching element and the electrical load. Consequently, in this preferred embodiment, just one voltage measuring unit is needed in order to ascertain the voltage of the second battery cell and the voltage that drops across the electrical load and the switching element of the first measuring circuit.

It is especially advantageous when the control unit is designed to ascertain, on the basis of the difference between the voltage of the second battery cell and the voltage that drops across the electrical load and the switching element of the first measuring circuit, whether the switching element of the first measuring circuit is switching correctly. If an electrical load is present at the battery, the voltage at each battery cell of the battery changes by an amount B as a result. This amount B is of equal size for each battery cell and has the same sign, which is to say the voltage change of each battery cell takes place in the same direction. This amount B is added to the voltage difference F at switching of the switching element of one of the measuring circuits. At switching of the first measuring circuit and of the third measuring circuit, the voltage difference is thus B+F. The voltage difference of the second battery cell is B−F when the switching elements of the first measuring circuit and of the third measuring circuit are switching correctly. The difference between the voltage of the second battery cell and the voltage that drops across the electrical load and the switching element of the first measuring circuit is consequently 2F. This difference is independent of the amount B, which is to say the voltage change B produced by the electrical load present across the battery. Consequently, it is possible to reliably ascertain whether the switching element of the first measuring circuit is switching correctly or not, regardless of whether an electrical load is present at the battery.

The invention additionally relates to a battery for a motor vehicle, in particular an electrically operated vehicle, having at least three battery cells and a device of the aforementioned type for monitoring the at least three battery cells of the battery.

The invention further relates to a method for monitoring at least three battery cells of a battery, the first battery cell, second battery cell, and third battery cell of which are connected in series in the stated sequence, in which a first switching element is controlled in order to connect a first electrical load into a path parallel to the first battery cell, a third switching element is controlled in order to connect a second electrical load into a path parallel to the third battery cell, and it is determined, on the basis of the voltage of the second battery cell and the voltage that drops across the first electrical load and the first switching element, whether the first switching element is switching correctly.

It is advantageous when it is ascertained at switching of one of the switching elements, on the basis of the voltage that drops across the aforementioned switching element and the electrical load that is arranged in the same path as the aforementioned switching element, whether an electrical interruption is present. For this purpose, it is ascertained, in particular, whether the voltage that drops across the switching element and the electrical load is below a predetermined voltage value. If the electrical connection between the battery cell and both the switching element and the electrical load is disconnected, then the electrical path in which the aforementioned elements are arranged is not closed. Consequently, no voltage or only a very low voltage can drop across the switching element and the electrical load. Therefore, an electrical interruption can be ascertained easily in this embodiment.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 6 is a graph of the behavior over time of the voltage measured by a voltage measuring unit of the device in accordance with FIG. 5.

DETAILED DESCRIPTION

Figure 1:
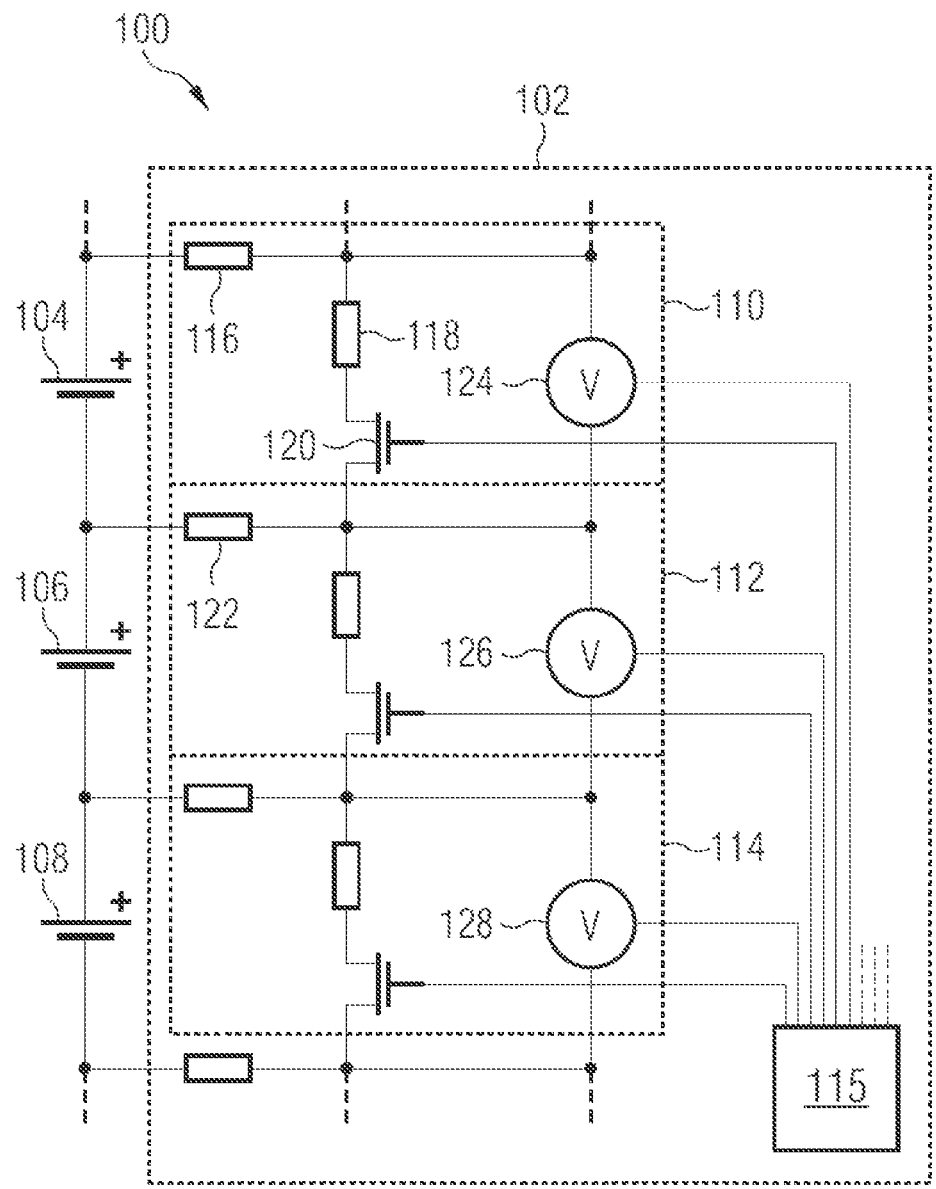
FIG. 1 is a circuit diagram of a battery with three battery cells and with a device for monitoring the battery cells according to one embodiment.

FIG. 1 shows a battery 100 with a device 102 for monitoring at least three battery cells 104, 106, 108 of the battery 100. For the sake of clarity, only three battery cells 104, 106, 108 are shown in FIG. 1. It is self-evident that the battery 100 can include more than the three battery cells 104, 106, 108 shown, and that the device 102 can be designed to monitor more than the three battery cells 104, 106, 108 shown.

The battery cells 104, 106, 108 of the battery 100 are connected in series. In the embodiment shown, each battery cell 104, 106, 108 can be operated between a minimum voltage of 1.8 V and a maximum voltage of 4.2 V. The rated voltage of the battery cells 104, 106, 108 is 3.6 V. If an electrical load is present at the battery 100, the voltage of the battery cells 104, 106, 108 changes. The amount by which the voltage of the battery cells 104, 106, 108 changes is normally time-dependent (see also FIG. 4), but is essentially equal in size for all battery cells 104, 106, 108. The three battery cells 104, 106, 108 shown in FIG. 1 are referred to hereinafter, from bottom to top, as first battery cell 104, second battery cell 106, and third battery cell 108.

The device 102 for monitoring at least three battery cells 104, 106, 108 includes switchable measuring circuits 110, 112, 114, of which three are shown by way of example in FIG. 1, and a control unit 115. The three measuring circuits 110, 112, 114 shown are referred to hereinafter, from bottom to top, as first measuring circuit 110, second measuring circuit 112, and third measuring circuit 114. Each of the three measuring circuits 110, 112, 114 shown is associated with one of the battery cells 104, 106, 108 and is connected to the two poles of the respective associated battery cell 104, 106, 108.

A first current path of each measuring circuit 110, 112, 114 includes, starting from a positive pole of the respective associated battery cell 104, 106, 108, a first resistive element 116, a second resistive element 118, a switchable switching element 120, and a third resistive element 122. For the sake of clarity, the reference symbols of the elements that are associated in each case with a measuring circuit 110, 112, 114 are given only for the elements of the first measuring circuit 110. The first resistive element 116 and the third resistive element 122 are implemented as ohmic resistances in the exemplary embodiment shown. In other embodiments, the first resistive element 116 and/or the third resistive element 122 can be a line resistance in each case. The first and third resistive elements 116, 122 of adjacent measuring circuits are arranged in such a manner that the third resistive element 122 of a measuring circuit corresponds to the first resistive element 116 of the measuring circuit that immediately follows this measuring circuit. In other words: two adjacent measuring circuits use the same resistive element 116, 122. The electrical resistance of the first resistive element 116 and of the third resistive element 122 is 1Ω in each case, for example. The second resistive element 118 is also referred to hereinbelow as a discharge resistor and has a resistance of 40Ω, for example, in the exemplary embodiment shown.

A second current path of each measuring circuit 110, 112, 114 includes a voltage measuring unit 124, 126, 128, which is also referred to hereinbelow as first voltage measuring unit 124 when it is associated with the first measuring circuit 110, etc. The second current path is arranged parallel to the second resistive element 118 and the switching element 120. If the switching element 120 is not switched, an electrical circuit is closed that includes the first resistive element 116, the voltage measuring unit 124, 126, 128, and the third resistive element 122. If the switching element 120 is not switched, the voltage of the battery cell 104, 106, 108 associated with the measuring circuit 110, 112, 114 is therefore measured by the voltage measuring unit 124, 126, 128. If, in contrast, the switching element 120 is switched, an electrical circuit is closed in addition that includes the elements of the first current path. In this case, the voltage that drops at an electrical load formed by the second resistive element 118 and the switching element 120 is measured by the voltage measuring unit 124, 126, 128.

The three resistive elements 116, 118, 122 of the measuring circuits 110, 112, 114, together with the internal resistance of the battery cells 104, 106, 108 associated with the measuring circuit 110, 112, 114 in question, and the switching element 120, form a voltage divider. Consequently, a voltage $U_i$ of the i-th battery cell 104, 106, 108 ascertained by the i-th voltage measuring unit 124, 126, 128 differs from the voltage that drops across the electrical load of the i-th measuring circuit 110, 112, 114 by a small amount, which is referred to hereinbelow as $\Delta U_i$, wherein the subscript i indicates which of the measuring circuits 110, 112, 114 is involved. In the exemplary embodiment shown, the voltage difference $\Delta U_i$ at switching of the switching element 120 is approximately 20 mV for all measuring circuits 110, 112, 114, for example.

The control unit 115 is connected to the voltage measuring units 124, 126, 128 and to the switching elements 120 of the measuring circuits 110, 112, 114. The control unit 115 is designed to control the switching elements 120 individually in order to switch them into either a blocking, i.e., non-current-carrying, or a non-blocking, i.e., current-carrying, state and to read out the voltage ascertained by the voltage measuring units 124, 126, 128. Switching a switching element 120 of a measuring circuit 110, 112, 114 into a non-blocking state causes the first current path of this measuring circuit 110, 112, 114 to be closed and the battery cell 104, 106, 108 associated with the measuring circuit 110, 112, 114 to be discharged. As a result, the charge stored in the battery cell 104, 106, 108, and thus the voltage of the battery cell 104, 106, 108, can be matched. Therefore it is possible to control the voltage of each of the battery cells 104, 106, 108 by means of the control unit 115 and to prevent the respective voltage of the battery cells 104, 106, 108 from rising above the maximum voltage. The control unit 115 can furthermore be designed to carry out a method for monitoring the battery 100, which is described below on the basis of FIG. 2.

Figure 2:
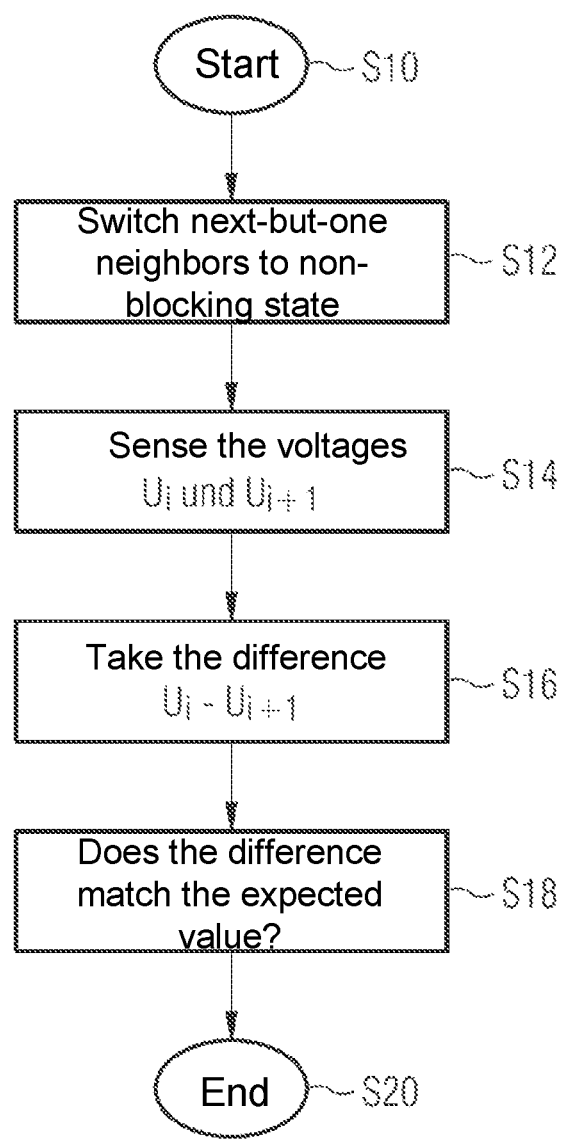
FIG. 2 is a flowchart of a sequence for monitoring the battery.

FIG. 2 shows a flowchart of a sequence for monitoring the battery 100. The method described on the basis of FIG. 2 can be carried out, in particular, with the device described in FIG. 1 for monitoring the battery 100.

The sequence is started in step S10 at a time t0. At this time t0, all switching elements 120 of the measuring circuits 110, 112, 114 are switched to a blocking state. The voltage $U_i$ measured by the voltage measuring unit 124, 126, 128 is equal to the voltage $Z_i$ of the battery cell 104, 106, 108, which is associated with the same measuring circuit 110, 112, 114 as the respective voltage measuring unit 124, 126, 128. At the time t0, the voltages of all battery cells 104, 106, 108 are approximately equal, so the subscript is dispensed with hereinbelow and the voltage of the battery cells 104, 106, 108 is referred to as Z.

Subsequently, in step S12 at a time t1, the switching elements 120 associated in each case with battery cells 104, 106, 108 that are next-but-one neighbors are switched to a non-blocking state. With regard to FIG. 1, these are the switching elements 120 of the first measuring circuit 110 and the first current path of the third measuring circuit 114. The first current path of the first measuring circuit 110 and of the third measuring circuit 114 are each closed by this means. Now, unlike at the time t0, the first voltage measuring unit 124 no longer measures the voltage Z of the first battery cell 104, but instead the voltage $U_{i+1}=Z-\Delta U_{i+1}$ that drops across the electrical load of the second measuring circuit 112, composed of the second resistive element 118 and the switching element 120. The voltage difference $\Delta U_{i+1}$ between the voltage measured at the time t0 and the voltage measured at the time t1 is equal to the sum of the voltage $U_{R1}$ that drops at the first resistive element 116 and the voltage $U_{R3}$ that drops at the third resistive element 122. In the exemplary embodiment shown in FIG. 1, the first resistive element 116 and the third resistive element 122 have the same electrical resistance. Consequently, the two voltages $U_{R1}$ and $U_{R3}$ have the same value $U_R$. In the exemplary embodiment shown, this value $U_R$ is 10 mV, for example. Therefore the voltage $U_{i+1}=Z-2U_R$ measured at the time t1 results. This applies analogously for the voltage $U_{i+1}=Z-2U_R$ R measured by the third voltage measuring unit 128 at the time t0. The behavior over time of the voltage $U_{i+1}$, which is measured by the first voltage measuring unit 124, is described in detail further below on the basis of FIGS. 3 and 4.

The third resistive element 122 of the first measuring circuit 110 is simultaneously the first resistive element 116 of the second measuring circuit 112, and the first resistive element 116 of the third measuring circuit 114 is simultaneously the third resistive element 122 of the second measuring circuit 112. The current flow through the third resistive element 122 of the first measuring circuit 110 and the first resistive element 116 of the third measuring circuit 114 at the time t1 consequently influences the voltage $U_i$ measured by the second voltage measuring unit 126 at the time t1. This is therefore $U_i=Z+2U_R$ at the time t1.

In step S14, the voltage $U_{i+1}$ measured by the first voltage measuring unit 124 at the time t1 and the voltage $U_i$ measured by the second voltage measuring unit 126 at the time t1 are then sensed by the control unit 115. After that, in step S16 the difference $U_i-U_{i+1}$ between the voltage $U_i$ measured by the second voltage measuring unit 126 at the time t1 and the voltage $U_{i+1}$ measured by the first voltage measuring unit 124 at the time t1 is ascertained. This voltage difference is $4U_R$, for example 40 mV. In step S18 a check is now made as to whether this expected value of the voltage difference was in fact measured. If a different value from this is measured, this means that at least one of the switching elements 120 of the first measuring circuit 110 or of the third measuring circuit 114 did not switch correctly. The voltage difference is, moreover, independent of the voltage Z battery cells 104, 106, 108, which itself is again dependent on the electrical load connected to the battery 100. Consequently, the method described on the basis of FIG. 2 makes it possible to determine, independently of the electrical load connected to the battery 100, whether the switching elements 120 of the first measuring circuit 110 and of the third measuring circuit 114 are switching correctly. After that, the sequence is terminated in step S20.

Figure 3:
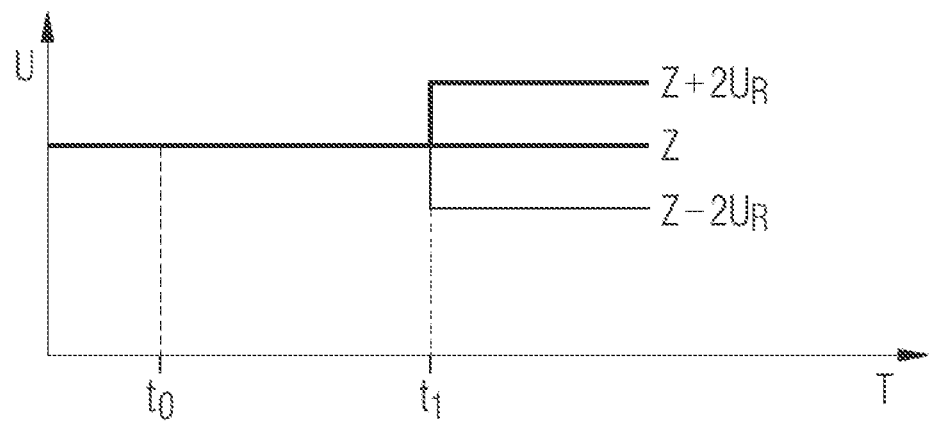
FIG. 3 is a graph of the behavior over time of voltages measured by a first voltage measuring unit and a second voltage measuring unit of the device with an unloaded battery.

FIG. 3 shows a graph of the behavior over time of the voltages measured by the first voltage measuring unit 124 and the second voltage measuring unit 126 for the case that the battery 100 is unloaded. The time T is plotted on the abscissa of the graph. Plotted on the ordinate of the graph is the value of the time behavior of the voltages U measured by a first voltage measuring unit 124 and a second voltage measuring unit 126 of the device. Until the time t1, these voltages U are equal to the voltage Z of the battery cells 104, 106, 108. At the time t1 when the switching elements 120 of the first measuring circuit 110 and of the third measuring circuit 114 are switched and the voltages U measured by the voltage measuring units 124, 126, 128 change in the manner described above. The voltage $U_{i+1}$ measured by the first voltage measuring unit 124 decreases by the value $2U_R$, which is 20 mV in the exemplary embodiment shown. The voltage $U_i$ measured by the second voltage measuring unit 126 rises by the value $2U_R$.

Figure 4:
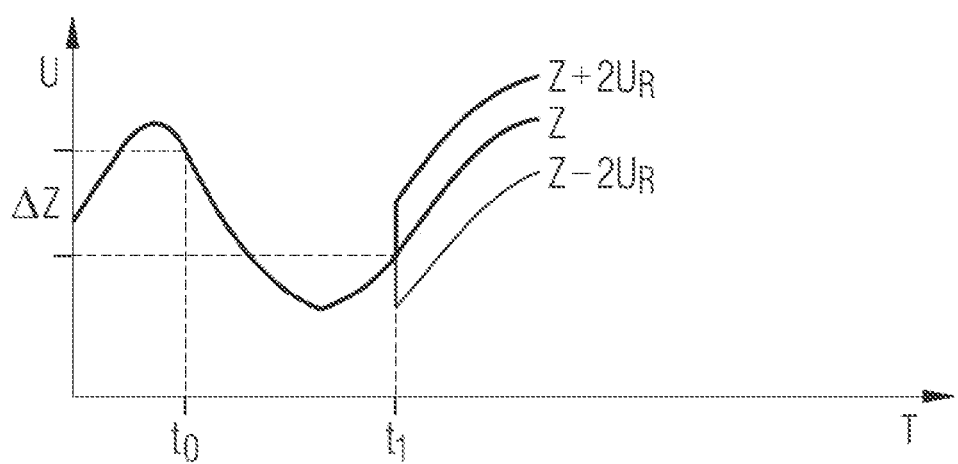
FIG. 4 is a graph of the behavior over time of the voltages measured by the first voltage measuring unit and the second voltage measuring unit of the device with a loaded battery.

FIG. 4 shows a graph of the behavior over time of the voltages measured by the first voltage measuring unit 124 and the second voltage measuring unit 126 for the case that the battery 100 is loaded. The time T is plotted on the abscissa of the graph. Plotted on the ordinate of the graph is the measured voltage U, wherein the depicted plots show the time behavior of the voltages U measured by a first voltage measuring unit 124 and by a second voltage measuring unit 126 of the device. The voltage Z of the battery cells 104, 106, 108 has a sinusoidal curve, such as is caused by an electric motor connected to the battery 100, for example. It is self-evident, however, that the voltage Z of the battery cells 104, 106, 108 can have any other time behavior.

Until the time t1, the voltages $U_{i+1}$ and $U_i$ measured by the first voltage measuring unit 124 and the second voltage measuring unit 126 each follow the voltage Z of the battery cells 104, 106, 108. At the time t1, the switching elements 120 of the first measuring circuit 110 and of the third measuring circuit 114 are switched and the voltages measured by the voltage measuring units 124, 126, 128 change in the manner described above.

Since the voltages $U_{i+1}$ and $U_i$ measured by the first voltage measuring unit 124 and the second voltage measuring unit 126 each follow the voltage Z of the battery cells 104, 106, 108, it cannot be ascertained clearly whether a voltage change was brought about by the switching of switching elements 120 or by the electrical load connected to the battery 100. Taken together, FIGS. 3 and 4 thus illustrate why taking the difference in step S16 of the sequence for monitoring the battery 100 described on the basis of FIG. 2 is advantageous. Taking the difference now produces a load-independent measured quantity on the basis of which it is possible to determine whether the switching elements 120 of the first measuring circuit 110 and of the third measuring circuit 114 are switching correctly.

Figure 5:
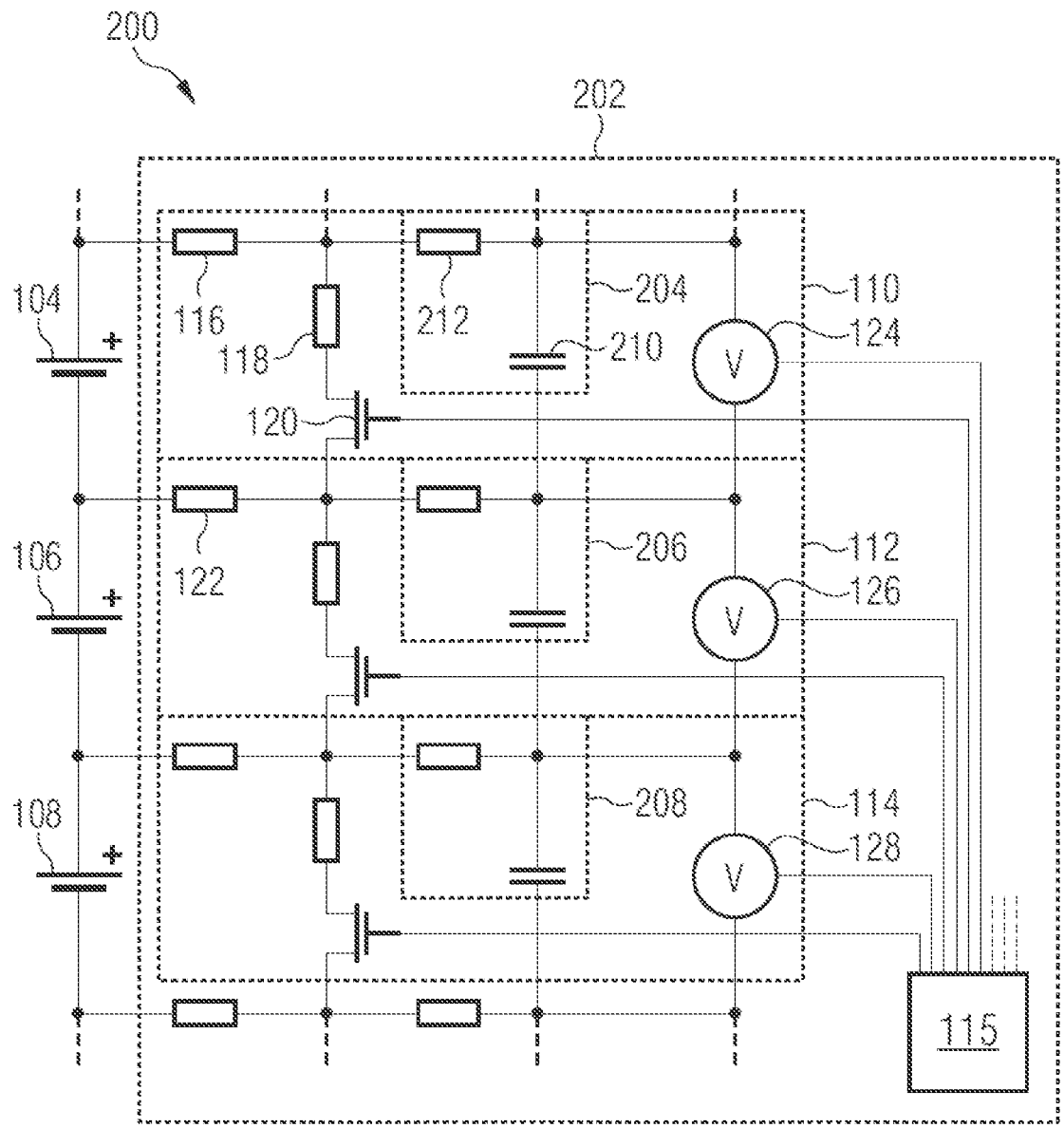
FIG. 5 is a circuit diagram of a battery with three battery cells and with a device for monitoring the battery cells according to a second embodiment.

FIG. 5 shows a battery 200 with a device 202 for monitoring the at least three battery cells 104, 106, 108 of the battery 200 in accordance with another embodiment. For better clarity, only three battery cells 104, 106, 108 are shown in FIG. 5 as well. The device 202 according to FIG. 5 differs from the device 102 according to FIG. 1 essentially in that each measuring circuit 110, 112, 114 additionally has an RC element 204, 206, 208. The RC elements are referred to hereinafter according to the respective associated measuring circuit 110, 112, 114 as first RC element 204, second RC element 206, and third RC element 208. Elements that are identical or have identical functions are labeled with identical reference symbols in FIGS. 1 and 5.

Each RC element 204, 206, 208 includes a capacitive element 210 and a fourth resistive element 212. For better clarity, only the elements of the first RC element 204 are labeled with reference symbols in FIG. 5. In the exemplary embodiment shown, the capacitive element 210 is composed of a capacitor, and the fourth resistive element 212 is composed of an ohmic resistance. By means of the RC element 204, 206, 208 of a measuring circuit 110, 112, 114, a third electrical path is formed that includes the battery cell 104, 106, 108, the first resistive element 116, the fourth resistive element 212, the capacitive element 210, a fourth resistive element of a measuring circuit 110, 112, 114 adjacent to the measuring circuit 110, 112, 114, and the third resistive element 122. The capacitive element 210 is thus connected in parallel to the electrical load of the respective measuring circuit 110, 112, 114 formed by the switching element 120 and the second resistive element 118, and to the battery cell 104, 106, 108 as well as the voltage measuring unit 124, 126, 128 associated in each case with the respective measuring circuit 110, 112, 114.

If the switching element 120 is not switched, which is to say not conductive, the voltage of the capacitive element 210 therefore follows the voltage Z of the battery cell 104, 106, 108 associated with the respective measuring circuit 110, 112, 114. If the switching element 120 is switched, which is to say switched into a conductive state, then the capacitive element 210 is discharged through the second resistive element 118 and the fourth resistive element 212 until the voltage of the capacitive element 210 corresponds to the voltage that drops across the electrical load composed of the switching element 120 and the second resistive element 118.

If, at the time t0, an electrical interruption occurs between a pole of the battery cell 104, 106, 108 and a pole of the capacitive element 210, which is to say in the third current path, then the voltage of the capacitive element 210 can no longer follow the voltage Z of the battery cell 104, 106, 108 and remains at the level it had prior to the electrical interruption. If the switching element 120 is subsequently switched at the time t1, which is to say switched into a non-blocking state, then the capacitive element 210 is discharged through the second resistive element 118 and the fourth resistive element 212 until its voltage has dropped to 0 V. This is described in detail below on the basis of FIG. 6. Furthermore, the voltage $U_i$ measured in each case by the voltage measuring unit 124, 126, 128 is smoothed by the RC elements 204, 206, 208.

FIG. 6 shows a graph of the behavior over time of the voltage measured by the voltage measuring unit 124, 126, 128 of the device in accordance with FIG. 5 for the case that the battery 200 is loaded. The time T is plotted on the abscissa of the graph. Plotted on the ordinate of the graph is the voltage U that is measured by the voltage measuring unit 124, 126, 128 and that is equal to the voltage of the capacitive element 210. Until the time t0, the voltage of the capacitive element 210 is equal to the voltage Z of the battery cell. At the time t0, an electrical interruption occurs between a pole of the battery cell and the capacitive element 210. The capacitive element 210 now is no longer charged or discharged, and its voltage no longer changes. As a result, the voltage measured by the voltage measuring unit 124, 126, 128 also remains constant. At the time t1, the switching element 120 is switched. The capacitive element 210 is rapidly discharged through the electrical load and its voltage decreases to 0 V. This can be sensed by the control unit 115 in order to decide in step S18 whether an electrical interruption is present in the measuring circuit 110, 112, 114 with which the capacitive element 210 is associated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device to monitor at least three battery cells of a battery, that includes a first battery cell, a second battery cell, and a third battery cell that are connected in series in the stated sequence, the device comprising:
   a first, second, and third measuring circuit associated with each of the first, second and third battery cells, respectively, the first, second, and third measuring circuits having an electrical load and is switched by a controllable switching element such that the electrical load is connected into a path parallel to the battery cell associated with the measuring circuit; and
   a control unit configured to switch the first measuring circuit, which is associated with the first battery cell, and the third measuring circuit, which is associated with the third battery cell, such that the electrical loads of the first and third measuring circuits are each connected into the path parallel to the battery cell associated with the respective measuring circuit,
   wherein the control unit is configured to ascertain, on the basis of a difference between a voltage of the second battery cell and a voltage that drops across the electrical load and the switching element of the first measuring circuit, whether the switching element of the first measuring circuit is switching correctly.

2. The device according to claim 1, wherein the electrical load of at least one measuring circuit is a resistive element, a capacitive element, or an inductive element.

3. The device according to claim 1, wherein an electrical connection between at least one measuring circuit and the battery cell associated with the measuring circuit is a detachable electrical connection.

4. The device according to claim 1, wherein at least one measuring circuit has a capacitive element that is connected into a path parallel to the electrical load of the measuring circuit and to the battery cell associated with the measuring circuit.

5. The device according to claim 4, wherein the measuring circuit has a resistive element that is connected into the path parallel to the electrical load of the measuring circuit and to the battery cell associated with the measuring circuit, and is connected in series with the capacitive element.

6. The device according to claim 4, wherein the control unit is configured to ascertain, on the basis of a voltage and/or of a voltage curve of the capacitive element, whether an electrical interruption is present in the measuring circuit.

7. The device according to claim 1, wherein at least one measuring circuit has a voltage measuring unit that is arranged and configured such that the voltage measuring unit measures the voltage of the battery cell associated with the measuring circuit when the measuring circuit is not connected, and wherein the voltage measuring unit measures the voltage drop across the electrical load and the switching element of the measuring circuit when the measuring circuit is connected.

8. The device according to claim 1, wherein the control unit is configured to ascertain, in a first step, whether an electrical interruption is present, and ascertain, in a second step, whether the switching element has a fault.

9. A battery for an electrically operated motor vehicle comprising at least three battery cells and a device according to claim 1 for monitoring the at least three battery cells of the battery.

10. A method for monitoring at least three battery cells of a battery, that includes a first battery cell, a second battery cell, and a third battery cell that are connected in series in the stated sequence, the method comprising:
    controlling a first switching element in order to connect a first electrical load into a path parallel to the first battery cell;
    controlling a third switching element in order to connect a third electrical load into a path parallel to the third battery cell; and
    determining, on the basis of a difference between a voltage of the second battery cell and a voltage that drops across the first electrical load and the first switching element, whether the first switching element is switching correctly.

11. The method according to claim 10, wherein, it is ascertained at switching of one of the switching elements, on the basis of the voltage that drops across the switching element and the electrical load that is arranged in a same path as the aforementioned switching element, whether an electrical interruption is present.

* * * * *